United States Patent
Vedula

(10) Patent No.: US 6,911,502 B2
(45) Date of Patent: Jun. 28, 2005

(54) POLYURETHANE ELASTOMERIC FIBER AND PROCESS FOR MAKING THE FIBER

(75) Inventor: Ravi Ram Vedula, North Ridgeville, OH (US)

(73) Assignee: Noveon IP Holdings Corp., Cleveland, OH (US)

( * ) Notice: Subject to any disclaimer, the term of this patent is extended or adjusted under 35 U.S.C. 154(b) by 0 days.

(21) Appl. No.: 09/792,604

(22) Filed: Feb. 23, 2001

(65) Prior Publication Data

US 2002/0161159 A1 Oct. 31, 2002

(51) Int. Cl.[7] .................... C08L 75/08; C08L 75/00; C08G 18/32; C08G 18/48; C08G 18/82
(52) U.S. Cl. ...................... 525/457; 264/165; 428/364; 525/458; 525/460
(58) Field of Search .................... 264/165; 428/364; 525/457, 458, 460

(56) References Cited

U.S. PATENT DOCUMENTS

| | | | |
|---|---|---|---|
| 3,016,364 A | 1/1962 | Miller | 528/79 |
| 3,494,894 A | 2/1970 | Urgesi | 528/65 |
| 3,503,933 A | 3/1970 | Kaizerman et al. | 528/64 |
| 5,536,781 A | * 7/1996 | Heidingsfeld et al. | 525/66 |
| 5,840,233 A | 11/1998 | Foss | 264/176.1 |
| 5,959,059 A | 9/1999 | Vedula et al. | 528/76 |
| 6,127,506 A | 10/2000 | Greene | 528/61 |

FOREIGN PATENT DOCUMENTS

| | | |
|---|---|---|
| EP | 0548364 | 11/1992 |
| JP | 57-112409 | 7/1982 |
| JP | 58098421 A2 | 6/1983 |
| JP | 58186609 A2 | 10/1983 |
| JP | 60048617 A2 | 3/1985 |
| JP | 1282387 A2 | 11/1989 |
| WO | WO9856845 | 12/1998 |

OTHER PUBLICATIONS

B.F. Goodrich Company, Product Data Sheet, ESTANE 58280 TPU Polyether Based Polyurethane (Estane Thermoplastic Polyurethanes), Jul., 2000.

* cited by examiner

*Primary Examiner*—Rabon Sergent
(74) *Attorney, Agent, or Firm*—Joe A. Powell; George W. Moxon, II; Thoburn T. Dunlap

(57) ABSTRACT

This invention is comprised of a thermoplastic polyurethane elastomer fiber obtained by melt spinning a polyurethane having a rebound of 60% or greater and a isocyanate-terminated polyether or polyester additive. The elastic fibers have low shrinkage, high heat resistance, low tensile set, and high elongation.

15 Claims, No Drawings

POLYURETHANE ELASTOMERIC FIBER AND PROCESS FOR MAKING THE FIBER

BACKGROUND OF THE INVENTION

The present invention relates to a polyurethane elastomeric fiber made by melt spinning a urethane having a rebound of 60% or higher and a isocyanate-terminated polyether or polyester to yield elastic fibers with low shrinkage, high heat resistance, low tensile sets and high elongation. Polyurethanes having improved elastomeric properties have many practical applications such as fabrics in consumer goods, such as hosiery and clothing, medical applications, recreational applications, automotive applications, or industrial applications, such as conveyor belting, cable jacketing, and the like.

A common elastic fiber used in the clothing industry is spandex. It is a stretchable fiber with a high elastic recovery. Spandex is used in many commercial yarns and fabrics to add elasticity to the clothing.

Spandex is defined by the Federal Trade Commission as a long-chain synthetic polymer comprising at least 85% of a segmented polyurethane. It is made by reacting a high molecular weight dihydroxy compound with an organic diisocyanate and chain extender to form an elastomer polymer. It is segmented because it is composed of alternating soft and hard regions within the polymer structure. The hard segments act as physical cross-links that tie the polymer chains together. The soft segments of the polymer chains are composed of polymers containing long, coiled, segments that can orient upon stretching the material. The cross-links prevent the polymer chains from moving significantly past each other. After stretching, the linear soft segments recover to a coiled form so that the fiber returns to its original shape.

It is preferably made by a dry spun process, although wet spinning and melt spinning processes are known. Du Pont first introduced spandex elastic polyurethane(urea) fiber in 1959, using a dry-spinning method. In 1937 Bayer introduced polyurethane elastic fiber made by a melt spinning method.

The dry spinning method is a process in which a long chain diol is reacted with aromatic diisocyanate (usually 4,4'-methylene diphenyldiisocyanate, MDI) to produce an isocyanate-terminated prepolymer. Chain extension is accomplished by reacting the prepolymer with diamine in the presence of a polar solvent to prepare spinning dope. The dope is then extruded from the nozzle in multi-filament form. The solvent is evaporated by coming in contact with hot air or hot $N_2$ in the spinning column. The spun yarn is then false-twisted, oil-treated and wound up on a bobbin. Dry spun fibers tend to lose strength upon aging.

The melt-spinning method is different in that both prepolymer preparation and chain-extension are conducted in the absence of solvent. To achieve a fiber with properties comparable to those achieved by dry spinning, it is necessary to subject the spun fiber to heat-aging treatment to promote cross-linking through the remaining isocyanate group.

The melt spinning method for polyurethane thermoplastic elastomers developed by Bayer in the late 1930s and early 1940s did not give satisfactory properties. Other melt spinning processes for polyurethanes are known. U.S. Pat. No. 3,503,933 disclosed a melt spun spandex which used asymmetric diisocyanates which have a five-fold difference in the reactivity of the two isocyanate groups. These diisocyanates resulted in the spandex having poor processing qualities such as high tack, poor fabric qualities such as low unload power, poor fabric processing properties in areas such as dyeing, finishing, and laundering. U.S. Pat. No. 5,840,233 to Foss et al. teaches a process for making melt-spun elastomeric fibers from a melt-spinnable elastomeric polymer comprising a diisocyanate-capped polyol prepolymer that is chain-extended with an aromatic dihydroxy compound. The fibers produced can be knit or woven into textile articles, such as hosiery or pantyhose.

U.S. Pat. No. 6,127,506, Green teaches a process for melt spinning spandex in which a polyurethane(urea) polymer is prepared from a purified capped glycol, linear aliphatic diamines and a monoamine chain terminator. During the process, the diisocyanate is contacted with the polymeric glycols to yield a capped glycol. The process in Green focuses on prepurifying the capped glycol prior to the formation of the polyurethaneurea. The polymeric glycols used in the process include polyether glycols, polyester glycols, polycarbonate glycols, and copolymers of the glycols. The diisocyanate has substantially the same reactivities toward the hydroxyl groups as the polymeric glycol. The preferred diisocyanate is MDI. In Green, the monomers are polymerized and then melt spun to yield spandex or polyurethane(urea).

Traditionally, spandex has been prepared by either dry-spinning or wet-spinning. Melt spinning is the most advantageous of the processes in terms of health, safety and environmental concerns because it does not involve the use of organic solvents. But, the dry-spun spandex produces a fiber having the best balance of properties compared to those made by the other processes. Therefore, a fiber material with the properties of spandex but which can be melt-spun instead of dry-spun is desirable. Although thermoplastic polyurethanes generally have desirable properties with regard to abrasion resistance, they do not generally exhibit properties such as high melting point, low tensile set, low compression set, good rebound, and low hysteresis.

Polyether polyurethanes are known. For example, U.S. Pat. No. 5,959,059 to Vedula et al. teaches a polyether urethane that has good physical properties when prepared by the melt polymerization of a hydroxyl-terminated polyether intermediate, containing alkylene oxide repeat groups of from 2 to 6 carbon atoms, and a chain extender with a diisocyanate. Vedula et. al, used aromatic diisocyanates, with MDI being preferred. Further, the thermoplastic polyether urethanes were produced by a "one-shot process," where the hydroxyl terminated polyether intermediate, the chain extender, and the diisocyanate were added together, mixed, and polymerized. Polyurethanes produced by this "one-shot" method are polyurethanes in which the chain extender includes aromatic moieties, having higher melting points. The resulting polyether urethanes exhibited high melting points, from 170° C. to 230° C., low densities, 1.10 or less, and Shore D hardness of at least 15 or 20. Additionally, the polyether urethanes exhibited good tear resistance, good abrasion resistance, and hydrolytic stability.

Melt spinning of polyurethane polymers is also known, including combining, with the polyurethane polymer in the melt additional materials to achieve various benefits. For example, Japanese Patent Publication JP58098421 (1983) (Yasuhiro et al.) teaches adding a reaction product from a polyisocyanate and a blocking agent to a polyurethane elastomer to produce an elastic yarn with high recovery from deformation at high temperatures. The reaction in the Yasuhiro publication, is between a polyisocyanate of 400 or more molecular weight, preferably p,p-diphenyl methane diisocyanate (MDI) and polytetramethylene glycol on both terminals and a blocking agent. Japanese patent publication 60048617 (2000) to Yamakawa et al., teaches melt spinning butylene terephthalate-based crystalline polyester and thermoplastic polyurethane to make an elastic fiber having a degree of luster of 70 or less. Japanese patent publication No. JP1282387 (1989) to Yoshimoto et al. teaches an elastic polyurethane yarn produced by kneading a polyisocyanate prepolymer as a crosslinking agent, where the yarn is subsequently treated with a mineral oil, polysiloxane, and diamine mixture, to prevent the sticking of the fibers. Japanese patent publication No. JP58186609 (1983) to Ogawa teaches fibers having improved heat resistance made by adding a polyisocyanate compound and a pigment to a molten polyurethane elastomer. Japanese patent publication No. JP57112409 (1982) to Ogawa et al. teaches an elastic yarn of high recovery from the deformation at elevated temperature made by adding to a molten polyurethane, a polyisocyanate reaction product having blocked NCO terminals from a polyether of 300 to 2,500 molecular weight and diphenylmethane diisocyanate.

SUMMARY OF THE INVENTION

This invention is the result of the discovery that a polyurethane elastomeric fiber can be obtained by bulk melt spin polymerization of a polyurethane having a rebound of 60% or higher and a chain extending or cross-linking isocyanate-terminated polyether or polyester additive. The polyurethane is preferably derived from a diisocyanate reacted with a hydroxyl-terminated polyether and a glycol chain extender. The polyether urethane preferably results from the polymerization of a hydroxyl terminated polyether intermediate and a chain extender with a diisocyanate, where the hydroxyl terminated polyether has alkylene oxide repeat units containing from 2 to 6 carbon atoms and has a weight average molecular weight of at least 1,500. The chain extender is a substantially non-branched glycol having 2 to 16 carbon atoms, and the amount of the chain extender is from 0.7 to less than 1.0 mole per mole of hydroxyl terminated polyether.

In the present invention, the polyurethane polymer, when it is melt spun to produce a fiber, is chain extended or cross-linked by incorporating the isocyanate-terminated prepolymers. The resulting fiber has improved heat resistance and reduced hysteresis loss, as compared to dry spun spandex, while still maintaining all the favorable properties of dry-spun spandex.

DETAILED DESCRIPTION OF THE INVENTION

This invention is directed to a polyurethane elastomeric fiber which can be obtained by bulk melt spun polymerization of a polyurethane and a isocyanate-terminated polyether or polyester additive. The polyurethane is derived from a diisocyanate reacted with a hydroxyl terminated polyether and a glycol chain extender.

The polyurethane used in this invention can be a polyether polyurethane or a polyester polyurethane which has a rebound of 60% or higher. One polyurethane that can be employed is a polyether polyurethane described in U.S. Pat. No. 5,959,059 to Ravi Vedula, the disclosure of which is incorporated by reference, although the present invention is not limited to the polyether urethanes described in the Vedula Patent. For example, U.S. Pat. No. 3,016,364, to Muller, which is also incorporated by reference, also teaches polyether urethanes which can be employed. A polyether urethane having good physical properties can be prepared by melt polymerization of a hydroxyl-terminated polyether intermediate and a chain extender with a diisocyanate. The hydroxyl-terminated polyether has alkylene oxide repeat units containing from 2 to 6 carbon atoms and has a weight average molecular weight of at least 1,500. The chain extender is a substantially non-branched glycol having 2 to 16 carbon atoms. The amount of the chain extender is from 0.7 to less than 1.0 mole per mole of hydroxyl terminated polyether. It is preferred that the polyether polyurethane have a melting point of about 160° C. or greater (e.g., 160° C. to 230° C.) with 175° C. or greater being preferred, although the softening point can be used to characterize the polyurethane. Further, it is preferred that the urethane has a rebound of 60% or more with 65% or greater being further preferred.

The additive is an isocyanate-terminated polyether or polyester additive, such as isocyanate-capped polyol prepolymer, which is preferably chain-extended with an aromatic dihydroxy compound. The term "isocyanate-terminated polyether or polyurethane additive" refers generally to a prepolymer which comprises a polyol that has been reacted with a diisocyanate compound (i.e., a compound containing at least two isocyanate (—NCO) groups). In preferred form, the prepolymer has a functionality of 2.0 or greater, an average molecular weight of about 250 to 10,000, and is prepared so as to contain substantially no unreacted monomeric isocyanate compound. The term "unreacted isocyanate compound" refers to free monomeric isocyanate-containing compound, i.e., diisocyanate compound which is employed as a starting material in connection with the preparation of the prepolymer and which remains unreacted in the prepolymer composition. The term "polyol" as used herein, generally refers to a polymeric compound having more than one hydroxy (—OH) group, preferably an aliphatic polymeric compound which is terminated at each end with a hydroxy group. A wide variety of polyol compounds is available for use in the preparation of the prepolymer. In preferred embodiments, the polyol may comprise a polymeric diol including, for example, polyether diols and polyester diols and mixtures or copolymers thereof. Preferred polymeric diols are polyether diols, with polyalkylene ether diols being more preferred. Exemplary polyalkylene polyether diols include, for example, polyethylene ether glycol, polypropylene ether glycol, polytetramethylene ether glycol (PTMEG) and polyhexamethylene ether glycol and mixtures or copolymers thereof. Preferred among these polyalkylene ether diols is PTMEG. Preferred among the polyester diols are, for example, polybutylene adipate glycol and polyethylene adipate glycol and mixtures or copolymers thereof. Other polyol compounds, in addition to those exemplified above, would be readily apparent to one of ordinary skill in the art, once armed with the present disclosure.

The number average molecular weight of the polyols from which the prepolymers may be derived may range from about 800 to about 3500 and all combinations and subcombinations of ranges therein. More preferably, the number average molecular weights of the polyol may range from about 1500 to about 2500, with number average molecular weights of about 2000 being even more preferred.

The polyol in the prepolymers is capped with an isocyanate compound. A wide variety of diisocyanate compounds is available for use in the preparation of the prepolymers of the present invention. Generally speaking, the diisocyanate compound may be aromatic or aliphatic, with aromatic diisocyanate compounds being preferred. Examples of suitable aromatic diisocyanate compounds include diphenylmethane diisocyanate, xylene diisocyanate, toluene diisocyanate, phenylene diisocyanate, and naphthalene diisocyanate and mixtures thereof. Examples of suitable aliphatic diisocyanate compounds include dicyclohexyl-methane diisocyanate and hexamethylene diisocyanate and mixtures thereof. Preferred among the diisocyanate compounds is MDI due, at least in part, to its general commercial availability and high degree of safety, as well as its generally desirable reactivity with chain extenders (discussed more fully hereinafter). Other diisocyanate compounds, in addition to those exemplified above, would be readily apparent to one of ordinary skill in the art, once armed with the present disclosure.

A preferred additive is diphenyl methane diisocyanate-terminated polyether prepolymer or diphenylmethane diisocyanate-terminated polyester prepolymer. These are polyether or polyester glycols where the hydroxyl groups are converted to isocyanate groups to provide the isocyanate termination. The former composition is available from Hyperlast Limited, UK, as Hyperlast® 5130, while the latter composition also is available from Hyperlast® Limited, as Diprane® 5128, which is derived from functional ethylene adipate and MDI, and Diprane® 5184, which is derived from butylene/hexylene adipate and MDI. The preferred additive is Hyperlast® 5130, which is a diphenyl methane diisocyanate-terminated polyether prepolymer derived from poly (tetramethylene ether) glycol having a MW of about 2000, and MDI.

The fiber is made by melt spinning the polyether urethane and the additive. Melt spinning is a well known process in which a polymer is melted by extrusion, passed through a spinning nozzle into air, solidified by cooling, and collected by winding the fibers on a collection device. Typically the fibers are melt spun at a polymer temperature of about 150° C. to about 300° C.

The invention can best be understood by reference to the following examples, in which the invention is presented in greater detail. The examples are not, however, to be construed to limit the invention herein in any manner, the scope of which is defined in the appended claims.

The properties of the fibers made in accordance with the present invention can be exemplified by comparing their performance with a Lycra® spandex fibers (from E.I. duPont), which are commercially available and made by a dry spinning process. The fibers in accordance with the present inventions were made by feeding Estane® 58280 polyether polyurethane, which has a melting point in the range of about 170° C. to about 230° C. (available from The BF Goodrich Company) and Hyperlast® diphenyl methane diisocyanate-terminated polyether cross-linking in the relative amounts indicated below, additive through an extruder under 12 MPa pressure, at a screw speed of 20 to 22 rpm, and a polymer temperature of 219° C. to react the polyurethane and the cross-linker, and subsequently passing the molten polymer to a melt spinning apparatus, operated at 195° C. The resulting fiber is cooled and recovered, and subjected to physical evaluation. The results of the evaluation are shown in Table I.

TABLE I

| TEST | Lycra® spandex | Estane® 58280 polyure-thane | Estane® 58280 with 10% by wt Hyperlast® 5130 | Estane® 58280 with 15% by wt Hyperlast® 5130 |
|---|---|---|---|---|
| 1st Cycle Set (%) | 21.54 | 31.03 | 22.92 | 18.76 |
| 5th Cycle Set (%) | 26.3 | 47.11 | 28.0 | 26.30 |
| 300% Mod. (N) 1st Cycle | 0.129 | 0.136 | 0.264 | 0.117 |
| Hysteresis (One Point) (%) | 41 | 50 | 47 | 37 |
| Kofler Softening Point 1 min (° C.) | 226 | 185 | 190 | 190 |
| Kofler Softening Point 3 min (° C.) | 226 | 185 | 190 | 190 |

Table I demonstrates the difference in performance between Lycra®, the polyurethane, the polyurethane with 10% of the cross-linker Hyperlast 5130, and the polyurethane with 15% of the cross-linker Hyperlast 5130. As Table I shows, when the polymer is chain extended and to some extent cross-linked by incorporating a isocyanate-terminated pre-polymer, such as Hyperlast 5130, the heat resistance is further improved.

Hysteresis is a measure of the energy loss during stretching and retraction of an elastic material. This energy loss translates into a loss of the fiber's elasticity. A large energy loss means an increase in heat generation and consequently an increase in discomfort. Table I shows that the addition of 15% Hyperlast can significantly reduce the hysteresis as compared to Lycra®.

Additional comparisons between Lycra® spandex and Estane® 58280 polyurethane, with and without Hyperlast® 5130 are presented in Tables II and III.

TABLE II

| Sample | Lycra® Spandex | Estane® 58280 (4 day oven aged at 70° C.) | Estane® 58280 (4 day oven aged at 70° C.) |
|---|---|---|---|
| % crosslinker | None | 10 | None |
| Additive Type | None | Hyperlast 5130 | None |
| Denier | 41.1 | 36.6 | 39.3 |
| Melt Index (g/10 min) (@ 210° C./ 3800 g) | — | 6 | 6 |
| Mw | 390849 | 420620 | 232641 |
| Mn | 90735 | 118748 | 87935 |
| Mw/Mn | 4.31 | 3.54 | 2.65 |
| Heat Set Data | | | |
| % set (30 min, 130° C., 200% Elong.) | 24.0 | 20.0 | 28.4 |
| % recovery (30 min, 130° C., 200% Elong.) | 76.0 | 80.0 | 71.6 |

TABLE II-continued

| Sample | Lycra ® Spandex | Estane ® 58280 (4 day oven aged at 70° C.) | Estane ® 58280 (4 day oven aged at 70° C.) |
|---|---|---|---|
| % set (90 sec, 185° C., 100% Elong.) | 16.7 | 21.2 | Broke/No Test |
| % recovery (90 sec, 185° C., 100% Elong.) | 83.3 | 78.8 | Broke/No Test |
| % set (90 sec, 185° C., 50% Elong.) | 11.4 | 13.2 | Broke/No Test |
| % recovery (90 sec, 185° C., 50% Elong.) | 88.6 | 86.8 | Broke/No Test |
| Shrinkage (%) (In Boiling Water) | 8.0 | 0.0 | 6.0 |

TABLE III

| | Denier | Tenacity (g/d) | Elongation (%) | 100% Stress (g/d) | 300% Stress (g/d) | Recovery from 200% Extension (%) Temperature/Exposure Time | | | |
|---|---|---|---|---|---|---|---|---|---|
| | | | | | | Room temp 5 mins | Room temp 24 hrs | 130° C. dry air 30 min | 100° C. hot water 30 min |
| 58280 with 10% by wt Hyperlast 5130 | 40.1 | 1.45 | 537.4 | 0.12 | 0.41 | 98.8 | 95.0 | 73.5 | 77.0 |
| Lycra ® | 40.1 | 1.02 | 575.2 | 0.10 | 0.38 | 98.8 | 98.3 | 69.0 | 68.5 |

As can be seen from Tables II and III, the melt spun fibers, made from polyurethane and a diisocyanate-terminated polyether additive, had heat set data recovery, and tenacity (tensile strength), comparable to Lycra® spandex.

The foregoing embodiments of the present invention have been presented for the purposes of illustration and description. These descriptions and embodiments are not intended to be exhaustive or to limit the invention to the precise form disclosed, and obviously many modifications and variations are possible in light of the above disclosure. The embodiments were chosen and described in order to best explain the principle of the invention and its practical applications to thereby enable others skilled in the art to best utilize the invention in its various embodiments and with various modifications as are suited to the particular use contemplated. It is intended that the invention be defined by the following claims.

What I claim is:

1. A thermoplastic polyurethane elastomer obtained by a bulk melt polymerization of:
    A. a polyurethane derived from a diisocyanate reacted with a hydroxyl terminated polyether intermediate and a glycol chain extender; wherein the amount of said chain extender is from about 0.7 to less than 1.0 mole per mole of said hydroxyl terminated polyether intermediate, and
    B. an isocyanate-terminated polyether additive, wherein said additive is capable of cross linking said polyurethane in (A).

2. An elastic fiber made by melt spinning the thermoplastic polyurethane elastomer of claim 1.

3. The fiber of claim 2, wherein the shrinkage is less than 10 percent at 100° C. in water for 30 minutes.

4. The fiber of claim 2, having a percent elongation and break of between about 300 and 700 percent, and shrinkage of less than 10 percent, at 100° C. in water for 30 minutes, and weight average molecular weight of between 300,000 and 500,000, and a recovery, at 30 minutes, 130° C., and 200% elongation, of more than more than 70 percent.

5. The fiber of claim 2, wherein such fibers are melt spun at a temperature of between about 150° C. and 300° C.

6. The elastomer of claim 1, wherein said diisocyanate in (A) is diphenyl methane diisocyanate.

7. The elastomer of claim 1, wherein said hydroxyl terminated polyether intermediate has alkylene oxide repeat units containing from 2 to 6 carbon atoms and has a weight average molecular weight of at least 1,500,
    said chain extender is a glycol having from 2 to 16 carbon atoms,
    the amount of said chain extender is from about 0.7 to less than 1.0 mole per mole of said hydroxyl terminated polyether intermediate, and
    the polurethan is (A) has a rebound of at least 60 percent when measured in accordance with ASTM D2632.

8. The elastomer of claim 1, wherein the polyurethane in (A) has a melting point of 160° C. or higher.

9. The elastomer of claim 1, wherein the polyurethane (A) has a melting point 175° C. or higher.

10. The elastomer of claim 1, wherein the polyurethane (A) has a melting point of 160° C. to 230° C.

11. The elastomer of claim 1, wherein the polyurethane in (A) has a rebound of 60% or higher, when measured in accordance with ASTM D2632.

12. The elastomer of claim 1, wherein the polyurethane in (A) has a rebound of 65% or higher, when measured in accordance with ASTM D2632.

13. The elastomer of claim 1, wherein said isocyanate-terminated polyether additive in (B) has a molecular weight of about 250 to 10,000and a functionality of 2.0 or greater 14. A method of making a melt-spun elastomeric fiber comprising melting a polyurethane having a rebound of 60% or more, as measured in accordance with ASTM D2632, together with an isocyanate-terminated polyether additive, melt-spinning to provide a fiber, and recovering said fiber; wherein said polyurethane is derived from a diisocyanate reacted with a hydroxyl terminated polyether intermediate and a glycol chain extender, and wherein the amount of said chainextender is from 0.7 to 1.0 mole per mole of said hydroxyl terminated polyether intermediate.

15. A method for the preparation of a melt-spun fiber comprising a melt-spinnable thermoplastic polyurethane elastomer composition, said elastomer composition comprising:

A. a polyether urethane derived from a diisocyanate reacted with a hydroxyl terminated polyether and a glycol chain extender, said hydroxyl terminated polyether having alkylene oxide repeat units containing from 2 to 6 carbon atoms and having a weight average molecular weight of at least 1,500, said chain extender being a glycol having from 2 to 16 carbon atoms, wherein the amount of said chain extender is from about 0.7 to less than 1.0 mole per mole of said hydroxyl terminated polyether intermediate and wherein said polyether urethane has a rebound of at least 60 percent when measured in accordance with ASTM D2632; and B. a diphenyl methane diisocyanate-terminated polyether additive, wherein said additive is capable of linking said polyether urethane in (A); and melt spinning said elastomer composition to provide a fiber.

* * * * *